United States Patent [19]

Frantz

[11] Patent Number: 4,561,464
[45] Date of Patent: Dec. 31, 1985

[54] RELAY VALVE

[75] Inventor: Virgil L. Frantz, Salem, Va.

[73] Assignee: Roanoke College, Salem, Va.

[21] Appl. No.: 668,979

[22] Filed: Nov. 7, 1984

[51] Int. Cl.[4] .......................................... F15B 13/042
[52] U.S. Cl. .............................. 137/596.18; 137/627.5
[58] Field of Search ...................... 91/454; 137/596.15, 137/596.18, 627.5, 637.2, 869

[56] References Cited

U.S. PATENT DOCUMENTS 3,741,245  6/1975  West ................................ 137/596.18
3,858,610  1/1975  Klimek .............................. 137/627.5

FOREIGN PATENT DOCUMENTS 1163622  2/1964  Fed. Rep. of Germany ... 137/637.2

Primary Examiner—Gerald A. Michalsky
Attorney, Agent, or Firm—Wilmer Mechlin

[57] ABSTRACT

A gas-actuated relay valve having an outlet port alternately connectable through opposed inlet and exhaust valve seats to inlet and exhaust ports, a lower downwardly opening valve head spring-urged for normally closing the seat to the inlet port, an upper upwardly opening normally unseated valve head for closing the seat to the exhaust port, and coaxial inner and floating outer pistons respectively connected to the lower valve head and mounting the upper valve head, the outer piston presenting a larger area than the inner piston to actuating gas received in a common actuating gas chamber for preventing loss through the exhaust port of operating gas introduced through the inlet port by closing the upper exhaust valve seat before opening of the inlet valve seat.

6 Claims, 3 Drawing Figures

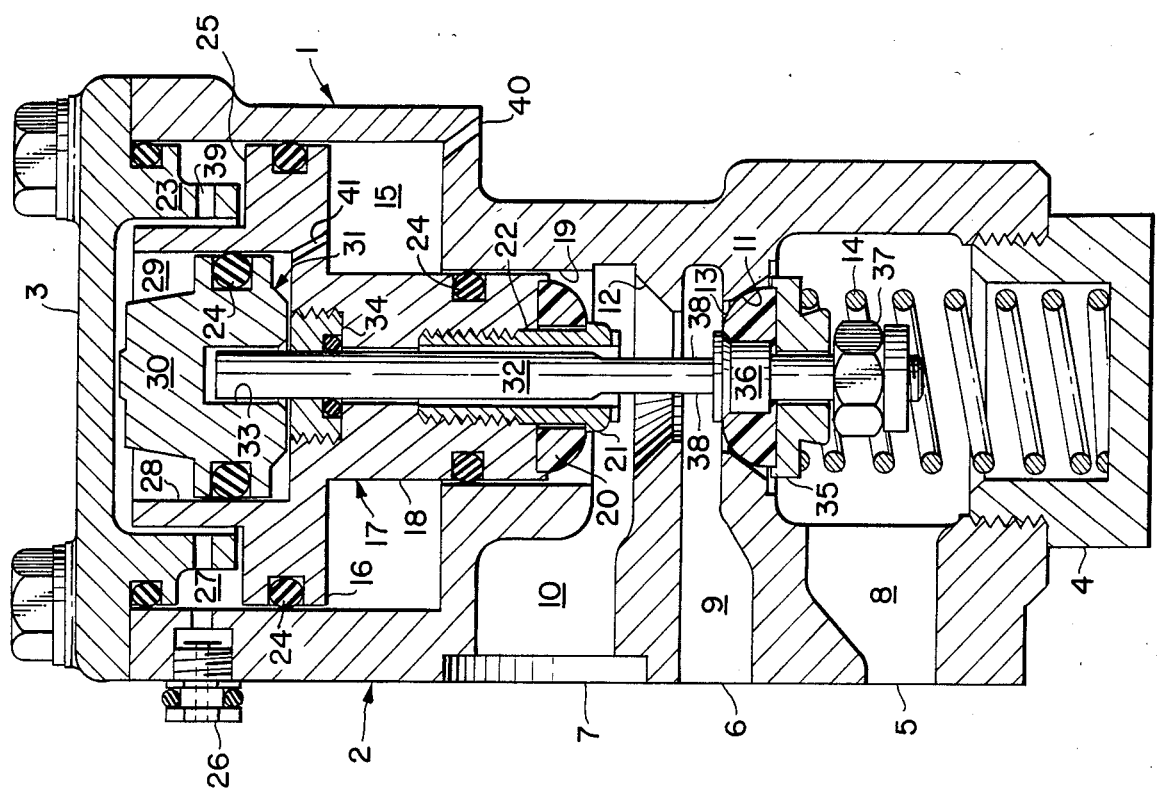
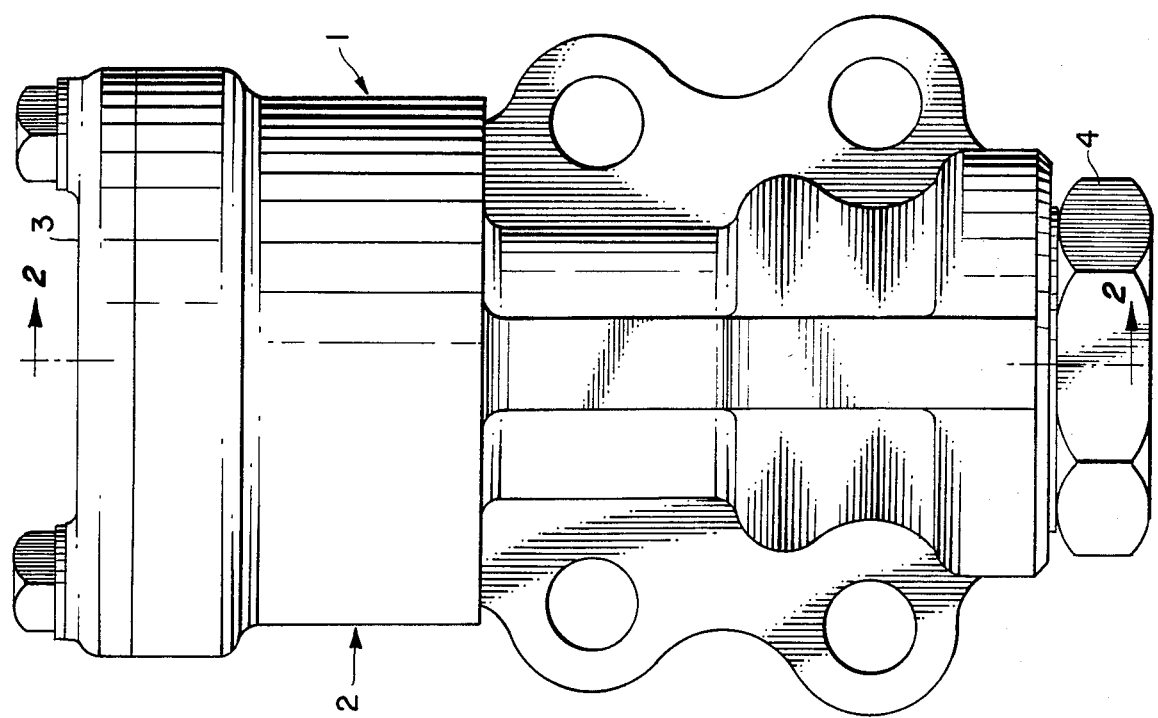

4,561,464

RELAY VALVE

BACKGROUND OF THE INVENTION

Heretofore, gas-actuated relay valves for alternately supplying and exhausting operating gas to and from devices operated by compressed gas, have had the common failing of losing operating gas through the exhaust port because unable to ensure closing of the exhaust port before opening of an inlet port. It is with the elimination of this failing in prior relay valves that the present invention is primarily concerned.

SUMMARY OF THE INVENTION

The primary object of the present invention is to provide an improved relay valve having inlet, outlet and exhaust ports and gas actuated valving so arranged and constructed as to close the exhaust port before opening of the inlet port.

Another object of the invention is to provide an improved gas actuated relay valve having in a valve body inlet, outlet and exhaust ports, inlet and exhaust valve seats connecting the outlet port respectively to the inlet port and the exhaust port, and coaxial floating and second differential pistons reciprocable in the body and each having a piston head exposable to actuating gas and an axially spaced smaller valve head, the floating and second piston valve heads respectively being seatable in and normally spaced from the exhaust seat and normally seating under spring pressure in the inlet seat, and the floating piston responding to less actuating gas pressure than the second piston for closing the exhaust seat before the inlet seat opens.

A further object of the invention is to provide an improved gas actuated relay valve having inlet, outlet and exhaust ports for supplying and exhausting compressed gas to and from a gas operated device, and inlet and exhaust valve seats connecting the outlet port respectively to the inlet port and the exhaust port, wherein by mounting on a floating piston a valve head for closing the exhaust seat and connecting a valve head normally closing the inlet seat and opposed in opening by a return spring to a second piston presenting to actuating gas in a common actuating gas chamber a smaller area than the floating piston, the valve head closing the inlet seat is prevented from opening except after the valve head for closing the exhaust seat has closed.

An additional object of the invention is to provide an improved relay valve according to the immediately preceding object, wherein the piston of smaller presented area is lostmotion connected to the lower valve head by a valve stem extending axially through the floating piston and is returned to normal position by the return spring or bleeding of actuating gas from the actuating gas chamber.

The foregoing and other objects and advantages of the invention will appear hereinafter in the detailed description, be particularly pointed out in the appended claims and be illustrated in the accompanying drawings, in which:

FIGURE DESCRIPTION

FIG. 1 is a side elevational view of a preferred embodiment of the improved relay valve of the present invention;

FIG. 2 is a vertical sectional view taken along lines 2—2 of FIG. 1, showing the valve in its normal condition with the lower valve seat closed; and FIG. 3 is a view on the same section as FIG. 2 but showing in solid line the intermediate actuated position in which both the upper and lower valve seats are closed and in dot-and-dash line the open position of the lower valve head on subsequent downward movement of the inner piston in completing the valve's gas actuated cycle.

DETAILED DESCRIPTION

Figure 3:
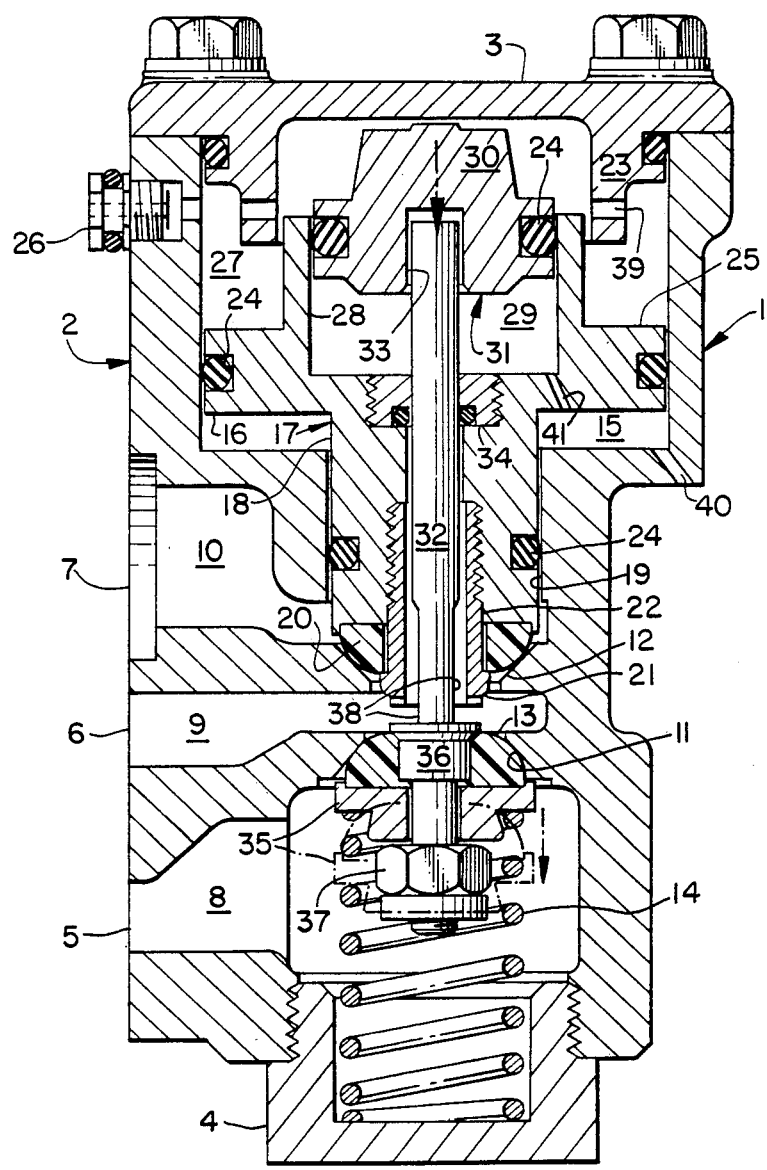

Referring now in detail to the drawings in which like reference characters designate like parts, the improved relay valve of the present invention is gas actuated for alternately supplying and exhausting compressed gas to and from devices operated by compressed gas and is particularly suited for use in installations in which the supply of operating gas is so limited as to be imperiled by a substantial loss of the gas through exhaust in opening of the valve to the operating gas source.

Designated as 1, the improved relay valve is comprised of an open-ended body 2 closed, preferably gastight, at the top by a top cap 3 and at the bottom by a bottom or spring cap 4. Designed for mounting on a suitable mounting bracket (not shown), the illustrated valve 1 has in superposed relation in sequence from the bottom an inlet port 5, outlet port 6, and exhaust port 7 and for each a corresponding inlet, outlet or exhaust passage 8, 9 or 10, respectively, extending in like relation inwardly into the body 2. The outlet passage 9 connects to or communicates with the inlet and exhaust passages 8 and 10 through a pair of opposed or oppositely opening tapered or frusto-conical valve seats, one, a lower or inlet seat 11 flaring and opening downwardly onto the inlet passage and the other, an upper or exhaust seat 12 flaring and opening upwardly onto the exhaust passage. The lower valve seat 11 is normally closed by a downwardly opening lower valve head 13, suitably in the form of an arcuately convex "TEFLON" or like resilient valve element normally held closed or seated in the lower seat by a return compression spring 14 acting upwardly between the valve head and the spring cap 4.

The valve body 2 contains in a cylindrical piston chamber 15 above the exhaust passage 10, a head 16 of a floating outer piston 17. Coaxial with the valve seats 11 and 12, the floating piston 17 has its piston head 16 vertically reciprocating in the chamber 15 and a shank 18 centered on and depending from the head and sliding or reciprocating vertically in an open-ended bore 19 in the body 2 coaxial with and extending between the chamber and the exhaust passage 10.

Of reduced or smaller cross-sectional area than the piston head 16, the shank 18 mounts on its lower end an upper valve head or washer 20, suitably arcuately convex and formed, as is the lower valve head 13, of "TEFLON" or like resilient material. Seatable in and normally spaced upwardly from the upper valve seat 12, the upper valve head 20, is held or secured in place by a radially outstanding annular flange 21 on a bottom of a bushing, sleeve or tubular retainer 22 inserted axially through the valve head and into and screwed or threaded in the shank 18.

Limited in upward movement by a coaxial annular skirt 23 on and depending from the top cap 3 and sealingly engaging the side walls of both the piston chamber 15 and the bore 19, as by peripherally grooving its head 16 and shank 18 for receiving O-rings 24, the floating piston 17 has the upper face or surface 25 of its head 16 exposable or presentable to actuating gas introduced through an actuating gas port 26 into an actuating gas chamber 27 in the valve body 2 between the piston head of the floating piston and the top cap 3. Excluded from the upper surface 25 so exposed is the center portion of that surface encircled by a coaxial upstanding collar or flange 28 radially spaced inwardly from the skirt 23 and containing or receiving in an upwardly opening cylindrical cavity 29 a relatively vertically slidable or reciprocable head 30 of an inner or second piston 31. Peripherally grooved for sealingly engaging the side wall of the cavity 29, as by another of the O-rings 24, the piston head 30 is connected, preferably with provision for a small degree of lost motion, to the lower valve head 13 by a valve stem 32 lost-motion or slidably fitting at its upper end in a downwardly opening socket 33 in the head and therebelow extending through a gasketed guide plug 34 screwed into the floating piston 17 below the cavity 29, the shank 18, retainer 21, upper valve head 20, upper and lower valve seats 12 and 11, lower valve head 13 and a backing plate or disc 35 for the lower valve head. For attaching or securing them to the lower end portion of the valve stem 32, the lower valve head 13 and its backing plate 35 are sandwiched or clamped between an annular abutment or shoulder 36 on and integral or rigid with the stem above the backing plate and a locknut 37 screwed onto the stem below that plate. Flats 38 are provided on the stem above the abutment 36 for gripping against turning by a wrench (not shown) while the locknut is applied.

In the operation of the valve 1, its inlet port 5 is connected through a mounting bracket (not shown) to a compressor or other source (not shown) of compressed gas, usually air, its outlet port 6 to the gas operated device or devices whose operation the valve is to control and its exhaust port 7 to atmosphere. The other port, the actuating gas port 26, is connected to the same or other source of compressed gas through a suitable manual or automatic flow-interrupting device, such as a timer or demand-responsive solenoid-actuated pilot valve (not shown).

In its normal position the relay valve has its lower valve seat 11 closed for blocking flow of gas from the source through the outlet port 6 to any device or devices the valve is to operate. To supply operating compressed gas to such device or devices, the relay valve is dependent on supply of actuating compressed gas through the actuating gas port 26 to the actuating gas chamber 27 for exerting downward forces on the heads 16 and 30 of the floating piston 17 and the inner or second piston 31. In the relay valve's actuated or device-operating cycle, the upper surface 25 of the floating piston head 16 is exposed directly to actuating gas entering the chamber 27, while, to reach the head 30 of the inner piston 31, the actuating gas flows through radial openings, gaps or notches 39 in the skirt 23 depending from the top cap 3 and therefrom between the skirt and the collar 28 on the floating piston head 16 to the upper surface of the head 31 of the inner piston. With any residual gas in the chamber 15 below the head 16 drainable through a bleed port 40 and the only resistance to its downward movement frictional, the floating piston 17 responds almost immediately to injection or introduction of actuating gas into the chamber 27 and a pressure as little as about 5 p.s.i. suffices to seat the upper valve head 20 in its seat 12 and block discharge or loss of gas through the exhaust passage 10 and port 7. A second bleed port 41 connects the cavity 29 below the head 30 to the chamber 15.

By contrast with the relatively slight resistance to downward or valve closing movement of the floating piston 17, the lower valve head 13 and therethrough the inner piston 31, is resisted in opening by the opposing forces of the return spring 14 acting upwardly against the backing plate 35 and the pressure of the gas from the compressed gas source. Whether or not obtained from the same source, the operating and actuating gases ordinarily will be supplied to the relay valve at the same pressure. In such case, to open at all, the inner piston 31 must be a differential piston with the area of its head 30 exposed to actuating gas larger than that of its valve head 13 exposed to operating gas and the differential must be sufficient also to overcome the upward force of the return spring 14 and produce a resultant downward or valve-opening force. With the heads 30 and 13 of the inner piston 31 of the illustrated relative sizes, the actuating gas in the chamber 27 must reach a pressure on the order of about 35 p.s.i. before the lower valve head can be unseated from its seat 11. Since the floating piston 17 also is a differential piston and, to facilitate quick closing, has the area of the outer surface 25 of its head 16 presented to actuating gas much larger than the area presented by the upper valve head 20 to pressure in the outlet passage 9, the same pressure differential will hold the upper valve head 13 seated against pressure exerted on it by operating gas entering through the lower valve seat 11. In the relay valve of this invention, the lower or inlet valve seat 11 therefore cannot open before the upper or exhaust valve seat 12 is closed and in operating the associated gas-operated device or devices, no operating gas from the source can be lost or exhausted to atmosphere.

When actuating gas is exhausted or bled from the actuating gas chamber 27 in the valve body 2 in the valve's exhaust cycle at the end of an operation of the associated gas operated device or devices, the inner piston 31 will be restored to normal position with its valve head 13 seated in the lower valve seat 11 by the then substantially unopposed upward forces of the return spring 14 and pressure of the operating gas, while the floating piston 17 will be shifted upwardly to open the upper valve seat 12 by the substantially unopposed upward force of operating gas remaining in the outlet passage 9. Again, as in a gas-actuated cycle, in the exhaust cycle the pistons are shifted in sequence with the inner piston 31 shifting first under force of the return spring 14 to close the lower valve seat 11 and block entry of operating gas through the inlet port.

From the above detailed description it will be apparent that there has been provided an improved relay valve for controlled supply of compressed gas to any gas operated devices which, while adapted to both supply and exhaust operating gas to and from such devices, is proof against loss of operating gas to exhaust during its actuated or supply cycle. It should be understood that the described and disclosed embodiment is merely exemplary of the invention and that all modifications are to be included that do not depart from the spirit of the invention and the scope of the appended claims.

Having now described my invention, I claim:

1. A gas actuated relay valve for supplying and exhausting operating gas to and from gas operated means, comprising a valve body having inlet, outlet and exhaust ports, an inlet valve seat between said inlet and outlet ports, an exhaust valve seat between said outlet and exhaust ports, an inlet valve head spring-urged for normally closing said inlet valve seat, an exhaust valve head seatable in and normally spaced from said exhaust valve seat, a springless floating piston and a second piston reciprocable in said body and respectively mounting said exhaust valve head and connected to said inlet valve head, an actuating gas chamber in said valve body, said floating and second pistons having piston heads exposable and responsive in said chamber to actuating gas for respectively seating said exhaust valve head and unseating said inlet valve head, and means enabling said floating piston to respond to a lower actuating gas pressure than said second piston for closing said exhaust valve seat before opening of said inlet valve seat.

2. A gas actuated relay valve for supplying and exhausting operating gas to and from gas operated means, comprising a valve body having inlet, outlet and exhaust ports, inlet and exhaust valve seats connecting said outlet port respectively to said inlet port and said exhaust port, an actuating gas chamber in said valve body, springless floating and second differential pistons reciprocable in said body and each having a piston head exposable in said chamber to actuating gas and an axially spaced smaller valve head, said floating and second piston valve heads respectively being seatable in and normally spaced from said exhaust valve seat and normally seating under spring pressure in said inlet valve seat, and means enabling said floating and second piston to respond in sequence to actuating gas pressure for closing said exhaust seat before said inlet seat opens.

3. A gas actuated relay valve according to claim 2, wherein the inlet and exhaust valve seats are vertically aligned and oppositely opening, and the differential pistons are coaxial with each other and the valve seats, and including compression spring means acting upwardly on the valve head of the second piston for normally closing the inlet valve seat.

4. A gas actuated relay valve according to claim 3, wherein the piston heads of the floating and second pistons reciprocate respectively in a piston chamber in the valve body and an upwardly opening cavity in the piston head of the floating piston, and the piston heads are exposable to actuating gas in the actuating gas chamber in the valve body between the floating piston head and a top cap of the body.

5. A gas actuated relay valve according to claim 4, wherein the piston and valve heads of the second piston are connected by an axial stem secured at one end to said valve head and slidably received at an opposite end in said piston head and therebetween axially extending through and shiftable relative to the floating piston and the valve seats.

6. A gas actuated relay valve for supplying and exhausting operating gas to and from gas operated means, comprising a valve body having inlet, outlet and exhaust ports, inlet and exhaust valve seats connecting said outlet port respectively to said inlet port and said exhaust port, an actuating gas chamber in said valve body, springless floating and second differential pistons reciprocable in said body and each having a piston head exposable in said chamber to actuating gas and an axially spaced smaller valve head, said floating and second piston valve heads respectively being seatable in and normally spaced from said exhaust valve seat and normally seating under spring pressure in said inlet valve seat, and means enabling said floating and second pistons to respond in sequence to actuating gas pressure for closing said exhaust seat before said inlet seat opens and respond in reverse sequence on bleeding of actuating gas from said body for closing said inlet seat before said outlet seat opens.

* * * * *